United States Patent Office 2,916,533
Patented Dec. 8, 1959

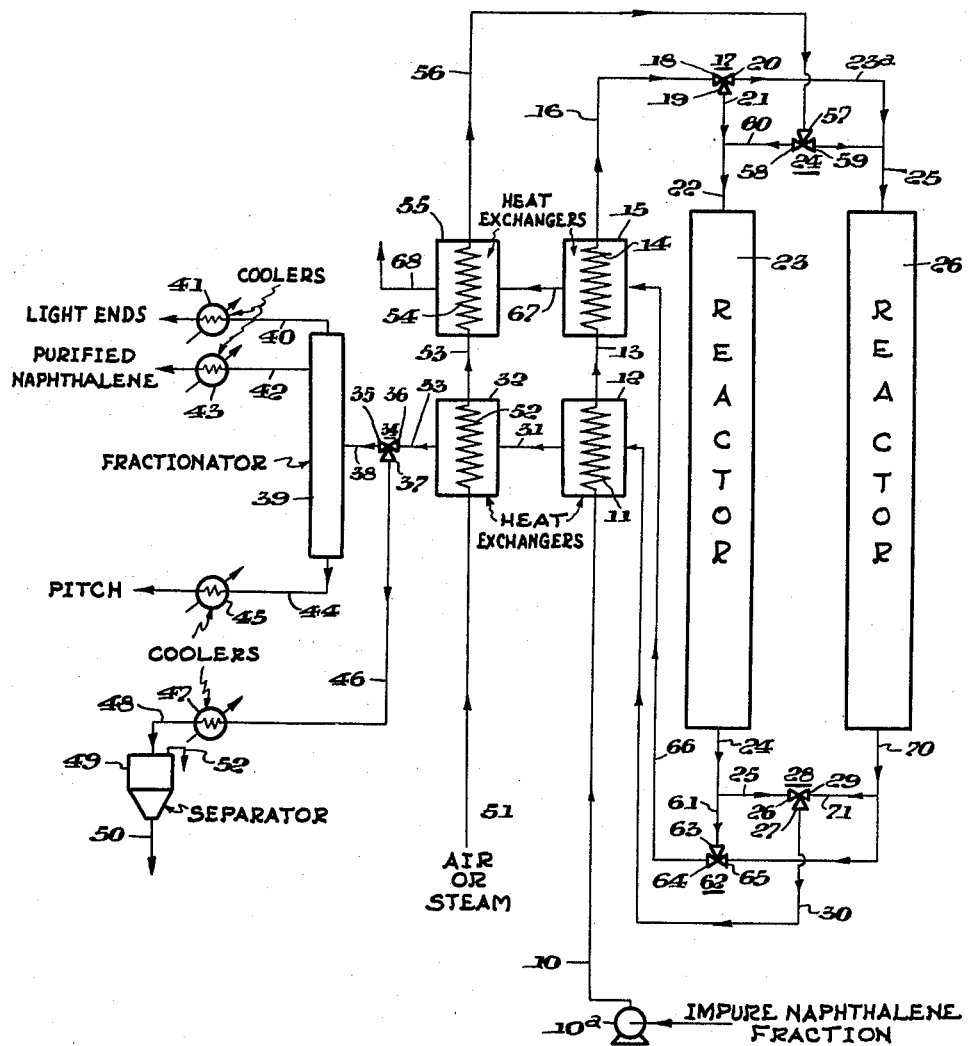

2,916,533

PURIFICATION OF NAPHTHALENE

Woodrow E. Kemp, Francis R. Charlton, and Margaret J. Waldron, Pittsburgh, Pa., assignors to Koppers Company, Inc., a corporation of Delaware Application May 27, 1957, Serial No. 661,735

20 Claims. (Cl. 260—674)

This invention relates generally to the purification of naphthalene obtained from the destructive distillation of coal and more particularly to a process for further purifying a partially purified naphthalene obtained from such coal distillation wherein the impurities associated with this naphthalene are disrupted in the presence of a catalyst to form reaction products of substantially lower molecular weight while the naphthalene remains substantially unchanged, and the naphthalene is thereafter separated from the reaction products, and, as such, is a continuation in part of copending application Serial No. 593,998, filed June 26, 1956, and now abandoned.

"Industrial pure" naphthalene is a naphthalene which has a melting point of 79.6° C., which contains only trace amounts of sulfur compounds, coumarone, etc., and no unsaturated hydrocarbons and no phenols or tar bases, and which is white in appearance and remains white over a prolonged period of time. Normally naphthalene of this purity is required for the preparation of dyestuff intermediates such as naphthols. On the other hand, a naphthalene melting at 78° C. or "phthalic grade" naphthalene is in considerable demand for oxidation to phthalic anhydride.

Naphthalene is generally obtained from the fractional distillation of coal tar which can be of by-product coke plant origin. In its crude form, the naphthalene from coal tar distillation varies from an oily semi-solid whose melting point may be in the neighborhood of 50° C. to a more or less crystalline solid whose melting point may be as high as 77° C. Such crude naphthalene normally contains, as impurities, small amounts of toluonitrile, indene and alkyl idenes, methyl and dimethyl coumarones, tar acids such as 2:4 and 2:6 xylenol and ethyl phenols, tar bases such as xylidenes and toluidenes, some saturated paraffins, polyalkyl benzenes, and as a major impurity, thionaphthene.

Crude naphthalene has been purified heretofore by washing with sulfuric acid, by recrystallization, and by fractional distillation. Washing a naphthalene of 78° C. melting point with sulfuric acid to produce a naphthalene of 79.6° C. melting point has a number of disadvantages in that such washing produces a considerable quantity of acid sludge which contains a substantial amount of naphthalene resulting in loss of this naphthalene and in that the concentrated grades of sulfuric acid used for this washing are expensive and are difficult to handle because of their highly corrosive nature. Recrystallization has not been satisfactory inasmuch as it requires numerous shallow pans, and is clumsy and cumbersome, and results in a considerable loss of naphthalene if the process is carried out over a prolonged time period. Fractional distillation has not been satisfactory because the impurities normally associated with naphthalene of coal tar origin are difficultly separable from the naphthalene and usually pass overhead with the naphthalene during the distillation.

An object of this invention, therefore, is to provide a novel naphthalene purification process which will result in a naphthalene having a preferred high degree of purity and will obviate the foregoing difficulties of the prior art.

In accordance with the instant invention crude naphthalene of coal tar origin in the vapor phase and in the absence of free oxyen-containing gas is contacted with a catalyst comprising an oxide of a metal in the left-hand column of group VI of the periodic table supported on alumina or other suitable carrier at a temperature of from about 450° C. to about 850° C., advantageously from about 450° C. to about 600° C., for a sufficient time to disrupt the impurities associated with the naphthalene so that purified naphthalene can be readily separated from the reaction products by fractional distillation or cooling or condensing. Contact times from about 0.01 second to about 1 minute are sufficient but contact times of from about 1 second to about 10 seconds are more desirable. Atmospheric, superatmospheric, or subatmospheric pressure can be utilized in the practice of this invention. However, it is essential not to employ temperatures below about 450° C. in this process because the impurities associated with the naphthalene are not sufficiently disrupted at temperatures below 450° C., and thereby reduced in molecular weight, to enable a naphthalene of a relatively high purity to be easily recovered from the reaction products. It is also essential that there be no free oxygen-containing gas, such as air, in the crude naphthalene vapors being contacted with the catalyst because a considerable portion of the naphthalene is destroyed when a free oxygen-containing gas is present with the crude naphthalene vapors in contact with this catalyst at the temperatures of this invention.

The instant process can be broadly utilized to remove impurities from a crude naphthalene of coal tar origin, but in order to obtain a 78° C. melting point naphthalene, a partially purified naphthalene feedstock having a melting point of about 68° C. or higher should be used; and in order to obtain "industrial pure" or a 79° C. melting point naphthalene, a partially purified naphthalene feed having a melting point of at least 74° C. should be used.

The foregoing and other objects and advantages of the invention will appear more fully from hereinafter consideration of the detailed description which follows, taken together with the accompanying drawing wherein an embodiment of an apparatus for carrying out the invention is illustrated. It is to be expressly understood, however, that the drawing is for illustration only and is not to be construed as defining the limits of the invention.

The single sheet of drawing illustrates diagrammatically an arrangement of apparatus for carrying out the novel process of the present invention.

As shown in the drawing, a pump 10a feeds the crude naphthalene directly from a distillation column or from storage, so long as the naphthalene contains no free oxygen-containing gas such as air, through line 10 into the coil 11 of heat exchanger 12. This impure naphthalene is preheated in heat exchanger 12 by indirect heat exchange with hot reaction product vapors as discussed hereinafter.

If the impure naphthalene be passed to heat exchanger 12 directly from a distillation column, the naphthalene is normally pitch free. However, if the impure naphthalene has been in storage and consequently has been exposed to air for a substantial time, it is advantageous to subject this naphthalene to a conventional depitching treatment before feeding the naphthalene to heat exchanger 12. This depitching treatment or operation generally comprises heating the crude naphthalene in a suitable vessel (not shown) under superatmospheric pressure to an elevated temperature, for example, to about 250° C., passing the naphthalene to an expansion chamber (not shown) wherein the heated naphthalene is allowed to expand, and separately withdrawing the naphthalene vapors from the top portion of the chamber and the pitchy material from the bottom portion of the chamber.

The heated naphthalene vapors pass through line 13 from heat exchanger 12 into the coil 14 of another heat exchanger 15 where the impure naphthalene is further heated by means of indirect heat exchange with hot gases from the catalyst regeneration step also as is hereinafter described, and passed through line 16 to a three-way valve 17 having valve members 18, 19 and 20. When valve members 18 and 19 are open and valve member 20 is closed, the impure naphthalene vapors pass through lines 21 and 22 to catalytic reactor 23. However, if valve members 18 and 19 be closed and valve member 20 be open, the impure naphthalene vapors pass through lines 23a and 25 to catalytic reactor 26. Of course at least valve member 58 or member 59 respectively, of three-way valve 24 in the catalyst regeneration gas line must also be closed to prevent these vapors from passing over to catalytic reactor 26 or reactor 23 respectively, or from passing out through the catalyst regeneration gas line.

In catalytic reactor 23, the impure naphthalene vapors contact a bed of catalyst comprising advantageously chromia, molybdena, or tungstic oxide supported on activated alumina. Mixtures of these metallic oxides supported on alumina can also be employed, if desired. The temperature within catalytic reactor 23 is maintained broadly within the range of from about 450° C. to about 850° C. and advantageously from about 450° C. to about 650° C. The catalytic reactor 23 can be heated by means of any suitable heating means, such as by jacket enclosing this reactor, which jacket receives a suitable heating fluid whose temperature is sufficiently high to bring the catalyst to the desired reaction temperature within the foregoing temperature ranges.

As the impure naphthalene vapors pass through the catalyst bed in reactor 23, the impurities associated with the naphthalene are disrupted to products of considerably lower molecular weight and rendered readily separable from the naphthalene which remains substantially unchanged. It is surprising that these impurities are disrupted to the high degree that they are while the naphthalene remains substantially unchanged. While cracking will usually occur to a limited extent in the case of a conventional dehydrogenation reaction wherein a dehydrogenation catalyst is employed, the impurities associated with the naphthalene are disrupted into smaller fragments or pieces to a considerably greater extent in the process than is the case with the conventional dehydrogenation reaction. Even high molecular weight condensed ring impurities such as quinoline, coumarone and thionaphthene are disrupted virtually completely while substantially no destruction of the naphthalene takes place. Among the fragments isolated from this disruption are methane, styrene, toluene and hydrogen-sulfide.

The reaction product vapors and gases flow from the bottom of catalytic reactor 23 through lines 24 and 25 to a three-way valve 28 having valve members 26, 27 and 29. With valve members 26 and 27 open and valve member 29 closed, the outgoing reaction product vapors pass through line 30 to heat exchanger 12 to preheat an incoming impure naphthalene fraction as described above. Thereafter, the reaction product vapors pass through line 31 to heat exchanger 32, where these hot vapors preheat an incoming gas for regenerating the catalyst in the catalytic reactor as will be hereinafter described, and thence through line 33 to a three-way valve 34 having valve members 35, 36 and 37. Valve 34 can feed the hot reaction products either to a fractionating column 39 for separation into light ends fraction, a purified naphthalene fraction, and a pitchy residue fraction or to a cooler 47 and separator 49 for separation of the liquid naphthalene from the relatively low molecular weight reactions products such as hydrogen, hydrogen sulfide, etc.

To feed the hot reaction product vapors directly to fractionating column 39, valve members 35 and 36 of three-way valve member 34 are opened and valve member 37 is closed so that the reaction product vapors flow through line 38 to the mid or intermediate portion of the fractionating column. A light ends fraction is removed as overhead through a line 40, advantageously provided with a cooler 41; a purified naphthalene, which is very often of the "industrial pure" grade, is removed as a side stream through line 42 and advantageously passed through a cooler 43 to condense the naphthalene; and a bottoms fraction usually of pitch or pitchy material is removed through line 44 and advantageously passed through a cooler 45. Fractionating column 39 may be equipped with bubble cap trays or provided with any suitable packing material.

To feed the hot reaction product vapors to a cooler 47 and separator 49, valve members 36 and 37 of the three-way valve 34 are opened and valve member 35 is closed so that the reaction product vapors flow through line 46 to cooler 47. The cooled reaction products pass then through line 48 to a separator 49 where the purified liquid naphthalene separates from gaseous impurities. The purified naphthalene is withdrawn through line 50; and the gaseous impurities, e.g., hydrogen, methane, hydrogen sulfide, etc., are withdrawn through line 52. The purified naphthalene from line 50 usually has a melting point above 78° C., but it is not, ordinarily, an "industrial pure" grade. This naphthalene can be sold commercially as such or it can be further upgraded or purified by being vaporized in a batch or continuous still, and fractionated by means of a suitable fractionating column such as fractionating column 39.

During the passage of the impure naphthalene vapors through the catalyst reactor 23, carbon is deposited on the catalyst as the disruption of the impurities occurs. The contacting of the impure naphthalene vapors with the catalyst must be terminated periodically as the activity of the catalyst decreases due to the carbon deposited thereon, and the catalyst regenerated.

To regenerate the catalyst of reactor 23, the passage of the impure naphthalene vapors through the reactor is stopped. Then, a free oxygen-containing gas such as atmospheric air, or, if desired, steam, is passed through line 51 into the coil 52 of heat exchanger 32 wherein this free oxygen-containing gas or steam is heated by indirect heat exchange with hot reaction products from the catalyst reactor which pass through this heat exchanger as previously described. Thereafter, the heated free oxygen-containing gas or steam passes through line 53 to the coil 54 of heat exchanger 55 for further heating by indirect heat exchange with hot gaseous products from the catalyst regeneration step and then passes through line 56 to a three-way valve 24 having valve members 57, 58 and 59. Valve members 57 and 58 are open and valve member 59 closed so that the preheated free oxygen-containing gas or steam passes through lines 60 and 22 and through the catalyst bed of reactor 23. Since the catalyst within the reactor 23 is being heated continuously to a temperature within the above temperature range, the passage of this preheated free oxygen-containing gas or steam through the catalyst burns out or strips the deposited carbon from this catalyst. The gaseous products of combustion from the reactor 23 pass through lines 24 and 61 to a three-way valve 62 having valve members 63, 64 and 65. Valve member 26 of three-way valve 28 is closed to prevent these gaseous products of combustion from passing out through the line for the reaction products. With valve members 63 and 64 of three-way valve 62 opened and valve member 65 closed, the gaseous products of combustion pass through line 66 to heat exchanger 15 to preheat an incoming impure naphthalene fraction as is previously described. Thereafter, these gaseous combustion products pass through line 67 to heat exchanger 55 to preheat the free oxygen-containing gas or steam for catalyst regeneration and then through line 68 to a stack or chimney. When the exit combustion gases show the absence of carbon dioxide, valve members 57, 58, 63 and 64 can be closed, valve members 18, 19, 26 and 27 opened, and impure naphthalene vapors again passed into the reactor until this catalyst again needs regeneration.

When atmospheric air is used as the free oxygen-containing gas for catalyst regeneration, an inert gas such as nitrogen, carbon dioxide, or steam is advantageously mixed with the air prior to regenerating the catalyst so as to control the combustion of the deposited carbon as this combustion raises the temperature of the catalyst in the catalytic reactor. Temperatures above about 850° C. may fuse, melt or otherwise deleteriously affect the catalyst so care should be taken against excessive temperature rise.

In a preferred embodiment of this invention, another catalytic reactor 26, identical with catalytic reactor 23, is provided in parallel arrangement with reactor 23 so that impure naphthalene fraction can be contacted with the catalyst in one catalytic reactor while the catalyst in the other catalytic reactor is being regenerated and vice versa to provide for substantially continuous purification of the impure naphthalene fraction. Hence while the fouled catalyst in catalytic reactor 23 is being regenerated by contacting this catalyst with free oxygen-containing gas or steam as is hereinbefore-described, valve members 18 and 20 of three-way valve 17 can be opened and valve member 19 closed so that preheated impure naphthalene vapors can be passed from line 16 through lines 23a and 25 to catalytic reactor 26 for disruption of the impurities. With valve member 65 of three-way valve 62 closed and valve members 29 and 27 of three-way valve 28 open while valve member 26 is closed, the reaction products from reactor 26 pass through lines 70, 71 and 30 to heat exchangers 12 and 32 and thereafter either to the fractionating column 39 or to the cooler 47 and separator 49.

After the impure naphthalene vapors have contacted the catalyst in reactor 26 for a sufficient period of time so that the activity of this catalyst is substantially reduced due to this catalyst being coated with carbon, the incoming stream of preheated impure naphthalene vapors will be switched over to catalytic reactor 23 and the stream of free oxygen-containing gas or steam will be switched over to catalytic reactor 26 to regenerate the catalyst therein. To this end, valve member 20 of three-way valve 17 is closed and valve member 19 opened, valve member 59 of three-way valve 24 is opened and valve member 58 is closed, valve member 26 of three-way valve 28 is opened and valve member 29 closed, and valve member 65 closed.

Although only two catalytic reactors 23, and 26, are illustrated, it is to be understood that a plurality of these catalytic reactors could be mounted in parallel with alternate operation for purification of naphthalene and regeneration. Synchronization of the three-way valves may be accomplished electronically or by other suitable means so as to simultaneously switch one catalytic reactor to on-stream with impure naphthalene vapors from regeneration and to switch another catalytic reactor from regeneration to on-stream with the impure naphthalene vapors.

The impure naphthalene vapors can advantageously be processed in a catalytic reactor for about one-half hour. Thereafter, the activity of the catalyst is decreased due to deposition of carbon and other material thereon. A high purity naphthalene of a 79° C. melting point or of an "industrial pure" grade can be obtained when the catalytic reactor is maintained on-stream for one-half hour or less; but if the contacting of the catalyst with impure naphthalene vapor is continued substantially longer than one-half hour, the quantity of carbon deposited on the catalyst reduces the activity of the catalyst to such an extent that the melting point of the naphthalene product drops to below 79° C. Also when the catalyst is contacted with the impure naphthalene vapors for a time period substantially greater than one-half hour, the regeneration period is correspondingly prolonged.

A conventional fluid bed or moving bed operation can be employed in catalytic reactors 23 and 26 instead of a fixed catalyst bed. Should a fluid catalyst bed or moving catalyst bed be utilized, the contacting of the impure naphthalene with the catalyst particles can be effected over a time period greater than the aforesaid one-half hour when the fixed catalyst bed is employed, as it is relatively easier to burn the carbon and carbonaceous material off the catalyst when the fluid bed or moving bed operation is employed.

The catalyst employed in this invention comprises a minor proportion of an oxide of a metal in the left-hand column of group VI of the periodic table, advantageously either chromia, molybdena, or tungstic oxide or a mixture of those oxides supported on a major proportion of alumina, advantageously activated alumina. Advantageously, from about 5% to 25% by weight of the oxide of this group VI metal or mixtures thereof and from about 95% to about 75% by weight of alumina. A preferred catalyst comprises about 5% by weight of chromia, molybdena or tungstic oxide and about 95% by weight of activated alumina as the support or carrier and a sufficient quantity of an alkali metal oxide such as potassium oxide or sodium oxide, based on the weight of this catalyst, to substantially reduce the carbon-forming tendency of this catalyst at the temperature in the catalytic reactor. The amount of this alkali metal oxide which has been found advantageous is about 2% by weight based on the weight of the catalyst.

The catalyst can be prepared by saturating alumina granules or pellets, preferably activatel alumina, with aqueous solutions of a water soluble group VI metal compound such as a water soluble chromium or molybdenum compound and, if desired, also containing an alkali metal hydroxide such as potassium hydroxide of suitable concentration depending on the desired chromia or molybdena and the desired alkali metal oxide content of the catalyst. The resultant catalyst pellets are then calcined or roasted at about 550° C. The alkali metal hydroxide can be added as a solution to the catalyst during the preparation of the catalyst by soaking the prepared catalyst in an alkali metal hydroxide solution of suitable concentration and thereafter heating the catalyst at an elevated temperature, e.g., about 550° C. The catalyst can also be prepared by mixing the precipitated oxides of the group VI metals such as the oxides of chromium or molybdenum with the precipitated gel of alumina, calcining this mixture at a temperature of about 550° C., and thereafter pelleting the catalyst with the aid of suitable dies and punches and lubricants to prevent sticking in the dies.

To prepare a tungstic oxide catalyst, a hot aqueous suspension of ammonium tungstate is sprayed on to small granules or particles of alumina, such as activated alumina, which granules are heated considerably above 100° C. After the spraying, the coated granules can be roasted in air at an elevated temperature, e.g., at about 400° C. for several hours. As an alternative method, finely divided tungstic oxide can be mixed mechanically with the alumina granules either in the wet or dry condition. A catalyst containing a mixture of molybdena, chromia, and tungstic oxide can also be prepared by this mechanical mixing.

Other suitable modes of preparing the catalyst of this invention will be apparent to those skilled in the art to which this invention appertains.

The following examples are provided as being illustrative of the instant invention but are not to be construed as limitations thereon. Percentages are by weight unless otherwise specified and the naphthalene is of coal tar origin:

*Example I*

Vapors of a distilled naphthalene fraction having a melting point of 75° C. were passed over a catalyst comprising 5% of molybdena on alumina. The temperature at the surface of the catalyst was 700° to 750° C., and the throughput was 0.4 volumes of liquid naphthalene per volume of catalyst per hour. The product naphthalene from the first 3 hours of processing had a melting point of 78.9° C.

*Example II*

Under the same conditions as Example I but substituting chromia for molybdena in the catalyst, the product naphthalene had a melting point of 78.17° C. after 3½ hours of operation.

*Example III*

A catalyst substantially identical to that utilized in Example II was treated with a solution of potassium hydroxide (2 gr. KOH per 100 gr. catalyst). The catalyst was then roasted at 550° C. for 2 hours. Vapors of a distilled naphthalene fraction having a melting point of 75° C. were then passed over the thus-treated catalyst, the temperature at the surface of the catalyst being 700°–750° C. and the throughput being 0.4 volumes of liquid naphthalene per volume of catalyst per hour. The product naphthalene from 5 hours operation had a melting point of 78.45° C.

*Example IV*

Panned naphthalene having a melting point of 77.8° C. was passed in the vapor phase over a coprecipitated molybdena-alumina catalyst (10% of molybdena) which had been alkalized with 2% KOH as in Example III. The temperature at the surface of the catalyst was 750°–800° C., and the throughput was 0.5 volumes of liquid naphthalene per volume of catalyst per hour. The product naphthalene from the first 3 hours of operation had a melting point of 79.23° C. Fractionation of this product yielded 75% of phenol-free naphthalene having a melting point of above 79.6° C. and an acid wash color of less than 15.

*Example V*

The catalyst from the contacting of Example IV, the surface of which was covered with carbon, was treated with a mixture of air and steam at the operating temperature of Example IV for 2 hours. 3 hours operation using the impure naphthalene vapors and operating conditions set forth in Example IV gave a product naphthalene having a melting point of 78.86° C.

*Example VI*

A coprecipitated chromia-alumina catalyst (5% chromia) alkalized with 2% of KOH and roasted at 550° C. for 20 hours gave a product naphthalene having a melting point of 79.17° C. after 3 hours of processing when contacted under the conditions of Example I. The feedstock naphthalene had a melting point of 77.8° C.

*Example VII*

The catalyst from Example VI was regenerated with air at 750°–800° C. for 2 hours. When contacted with the naphthalene vapors and operating conditions substantially identical to those of Example VI, the product naphthalene from the first 3 hours had a melting point of 78.97° C.

*Example VIII*

The catalyst after use in Example VII was heated in air at 600° C. for 20 hours. When contacted with the naphthalene vapors under operating conditions substantially identical to those of Example VII, the product naphthalene of the first 3 hours operation had a melting point of 79.25° C.

*Example IX*

Vapors of a naphthalene having a melting point of 68° C. were passed over a coprecipitated molybdena-alumina catalyst (5% of molybdena) at 750° to 800° C. at a throughput of 0.3 volumes of liquid naphthalene per volume of catalyst per hour. The product naphthalene from the first 2 hours of operation had a melting point of 78.16° C.

*Example X*

Naphthelene of melting point 77.8° C. was passed in the vapor phase over a catalyst comprising 10% of chromia on activated alumina at a throughput of 0.35 volumes of liquid naphthalene per volume of catalyst per hour and a temperature of 725°–775° C. The product naphthalene had a melting point of 79.9° C. over the first ½ hour of operation.

*Example XI*

Vapors of naphthalene of melting point 74.5° C. were passed over a catalyst comprising activated alumina impregnated with 5% of tungstic oxide under the operating conditions of Example X. The product naphthalene had a melting point of 79.88° C. over the first ½ hour of operation.

*Example XII*

Naphthalene of melting point 76° C. was passed in the vapor phase over a catalyst comprising activated alumina impregnated with 2% each of molybdena, tungstic oxide and chromia under the operating conditions of Example X. The product naphthalene had a melting point of 79.3° C. over the first ½ hour of operation.

*Example XIII*

Distilled naphthalene of melting point 77° C. and containing 3.0° thionaphthene was passed over a catalyst of coprecipitated molybdena alumina (17% molybdena) at a temperature of 450–475° C. and a throughput of 1.2 volumes per volume per hour. Ninety percent by weight of the material fed was recovered with a melting point of 78.8° C. and a thionaphthene content of 1.8% during the first ½ hour operation.

*Example XIV*

The same feedstock as the above Example XIII at a throughput of 2.4 volume/volume/hour, was passed over the same catalyst at a temperature of 610° C. The product over the first 10 minutes of operation represented a recovery of 77.2% with melting point of 79.5 and thionaphthene of 0.7%. Over the following 10 minute period, a 87.2% recovery was realized with a melting point of 78.5° and 2.3% thionaphthene. During the third 10 minute period of operation, the recovery was 91.2%, melting point of 78.2° and thionaphthene 2.8%.

*Example XV*

Operating under identical conditions to those described in Example XIV with the addition of 5 volumes/vlm./minute of air. The recovery over the first ten-minute period was 75% with melting point 78.9 and thionaphthene content 2.4%. Over the following ten-minute period, the recovery was 78%, melting point 78.5, thionaphthene, 2.8%.

*Example XVI*

Using the same conditions as described in Example XIV, the catalyst was pretreated with hydrogen preheated as in the case of the air for the regeneration and at a rate of 5 volumes/volume/minute for ten minutes before feeding naphthalene vapors. The recovery, melting point and thionaphthene contents over the first 3 consecutive ten-minute periods are shown below.

|  | Minutes | | |
| --- | --- | --- | --- |
|  | 0-10 | 10-20 | 20-30 |
| Yields | 84.9 | 87.9 | 92.5 |
| Melting point | 79.2 | 78.5 | 78.2 |
| Thionaphthene, percent | .49 | 2.3 | 2.9 |

A comparison of Example XIV, XV and XVI reveals a further novel feature of the invention, namely, that the purity and yield of naphthalene is increased when the oxide catalyst of the present invention is treated with hydrogen or partially reduced.

The foregoing has presented a novel process for the purification of crude naphthalene by disrupting the impurities so that the naphthalene can be readily separated from the reaction product.

What is claimed:

1. A process for the purification of crude naphthalene of coal tar origin containing impurities, including thianaphthene and methylcoumarones which comprises contacting said crude naphthalene in the vapor phase in the absence of free oxygen-containing gas with a catalyst comprising 5 to 25% of an oxide of a metal in the left-hand column of group VI of the periodic table supported 95 to 75% on alumina at a temperature of from about 450° to about 850° C. for a contact time sufficient to convert the impurities of said crude naphthalene into reaction products of substantially lower molecular weight while the naphthalene remains substantially unchanged, and recovering purified naphthalene from the reaction products.

2. A process in accordance with claim 1 wherein said crude naphthalene is passed into contact with said catalyst at a temperature of from about 450° to about 600° C.

3. A process in accordance with claim 1 wherein the catalyst comprises chromia supported on alumina.

4. A process in accordance with claim 1 wherein the catalyst comprises tungstic oxide supported on alumina.

5. A process in accordance with claim 1 wherein the catalyst comprises molybdenum oxide supported on alumina.

6. A process for purifying crude naphthalene of coal tar origin containing impurities, including thianaphthene and methylcoumarones and having a melting point of at least about 74° C. which comprises contacting said crude naphthalene in the vapor phase and free of free oxygen-containing gas with a catalyst comprising 5 to 25% of an oxide of a metal in the left-hand column of group VI of the periodic table supported 95 to 75% on alumina at a temperature of from about 450° to 850° C. and for a period of from about .01 second to about 1 minute to convert said impurities into reaction products of substantially lower molecular weight and to leave the naphthalene substantially unchanged, and recovering a purified naphthalene from said reaction products.

7. A process for purifying crude naphthalene of coal tar origin containing impurities, including thianaphthene and methylcoumarones and having a melting point of at least about 74° C., which comprises contacting said crude naphthalene in the vapor phase and free of free oxygen-containing gas with a catalyst comprising 5 to 25% of an oxide of a metal in the left-hand column of group VI of the periodic table supported 95 to 75% on activated alumina at a temperature of from about 450° to 850° C. and for a contact time of from about 1 second to about 10 seconds to convert said impurities into reaction products of substantially lower molecular weight, while leaving the naphthalene substantially unchanged, and recovering a purified naphthalene from the reaction products.

8. A process in accordance with claim 7 wherein the catalyst comprises from about 5% to about 25% of chromia supported on from about 95% to about 75% of activated alumina.

9. A process in accordance with claim 7 wherein the catalyst comprises from about 5% to about 25% of molybdenum oxide supported on from about 95% to about 75% of activated alumina.

10. A process in accordance with claim 7 wherein the catalyst comprises from about 5% to about 25% of tungstic oxide supported on from about 95% to about 75% of activated alumina.

11. A process for purifying crude naphthalene of coal tar origin containing impurities, including thianaphthene and methylcoumarones and having a melting point of at least about 74° C., which comprises contacting said crude naphthalene in the vapor phase and free of free oxygen-containing gas at a temperature of from about 450° to 800° C. with a catalyst comprising from about 5% to about 25% of an oxide of a metal in the left-hand column of group VI of the periodic table supported on from about 95% to about 75% of alumina, and a sufficient quantity of an oxide of an alkali metal to reduce the carbon-forming tendency of the catalyst for a contact time of from about .01 second to about 1 minute to convert said impurities into reaction products of substantially lower molecular weight while the naphthalene remains substantially unchanged, and fractionally distilling the mixture of reaction products and naphthalene to separate a purified naphthalene from the reaction products.

12. A process in accordance with claim 11 wherein said contact time is from about 1 second to about 10 seconds.

13. A process in accordance with claim 11 wherein the catalyst comprises from about 5% to about 25% of chromia supported on from about 95% to about 75% of activated alumina and a sufficient quantity of potassium oxide to reduce the carbon-forming tendency of said catalyst.

14. A process in accordance with claim 11 wherein the catalyst comprises from about 5% to about 25% of molybdenum oxide supported on from about 95% to about 75% of alumina and a sufficient quantity of potassium oxide to reduce the carbon-forming tendency of said catalyst.

15. A process in accordance with claim 11 wherein said catalyst comprises from about 5% to about 25% of tungstic oxide supported on from about 95% to about 75% of activated alumina and a sufficient quantity of potassium oxide to reduce the carbon-forming tendency of said catalyst.

16. A process for purifying crude naphthalene of coal tar origin containing impurities, including thianaphthene and methylcoumarones and having a melting point of at least about 68° C., which comprises contacting said crude naphthalene in the vapor phase and free of free-oxygen-containing gas with a catalyst comprising from about 5% to about 25% of an oxide of a metal in the left-hand column of group VI of the periodic table supported on from about 95% to about 75% of alumina at a temperature of from about 450° to about 850° C. for from about .01 second to about 1 minute to convert said impurities into reaction products of substantially lower molecular weight while the naphthalene remains substantially unchanged, continuing such contacting until the activity of said catalyst has been substantially reduced due to deposition of carbon thereon, then terminating the contacting, regenerating said catalyst, resuming the contacting of said crude naphthalene with the regenerated catalyst as before, and fractionally distilling the mixture of naphthalene and reaction products to separate a purified naphthalene from said reaction products.

17. A process in accordance with claim 16 wherein the catalyst comprises from about 5% to about 25% of chromia supported on from about 95% to about 75% of activated alumina.

18. A process in accordance with claim 16 wherein the catalyst comprises from about 5% to about 25% of molybdenum oxide supported on from about 95% to about 75% of activated alumina.

19. A process in accordance with claim 16 wherein the catalyst comprises from about 5% to about 25% of tungstic oxide supported on from about 95% to about 75% of activated alumina.

20. A process for purifying crude naphthalene of coal tar origin containing impurities, including thianaphthene and methylcoumarones which comprises contacting a catalyst comprising from about 5% to about 25% of an oxide of a metal in the left-hand column of group VI of the periodic table supported on from about 95% to about 75% of an alumina carrier with preheated hydrogen to partially reduce said oxide, thereafter contacting said catalyst with crude naphthalene in the vapor phase and free of free oxygen-containing gas and at a temperature of from about 450° to about 850° C., and for about .01 second to about 1 minute to convert said impurities into reaction products of substantially lower molecular weight while the naphthalene remains substantially unchanged, and thereafter separating the naphthalene from the reaction products.

References Cited in the file of this patent

UNITED STATES PATENTS

| | | |
|---|---|---|
| 2,184,234 | Groll et al. | Dec. 19, 1939 |
| 2,455,634 | Wilson et al. | Dec. 7, 1948 |
| 2,585,033 | Pitzer | Feb. 12, 1952 |
| 2,700,638 | Friedman | Jan. 25, 1955 |
| 2,727,854 | Brown et al. | Dec. 20, 1955 |